C. FLECK & G. R. MAGEE.
EMERGENCY STOP VALVE.
APPLICATION FILED OCT. 30, 1913.
1,125,503.
Patented Jan. 19, 1915.
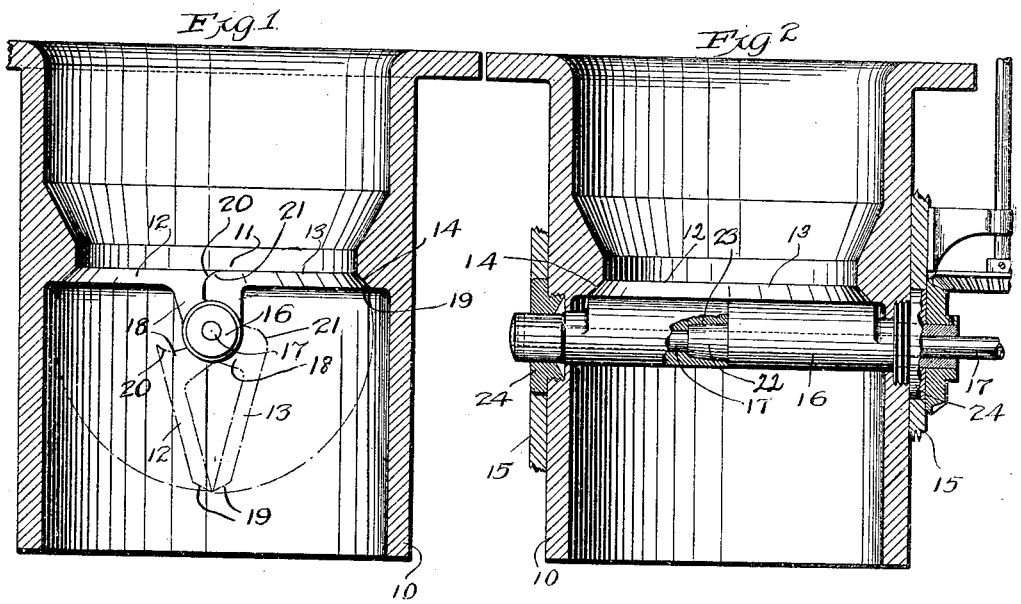
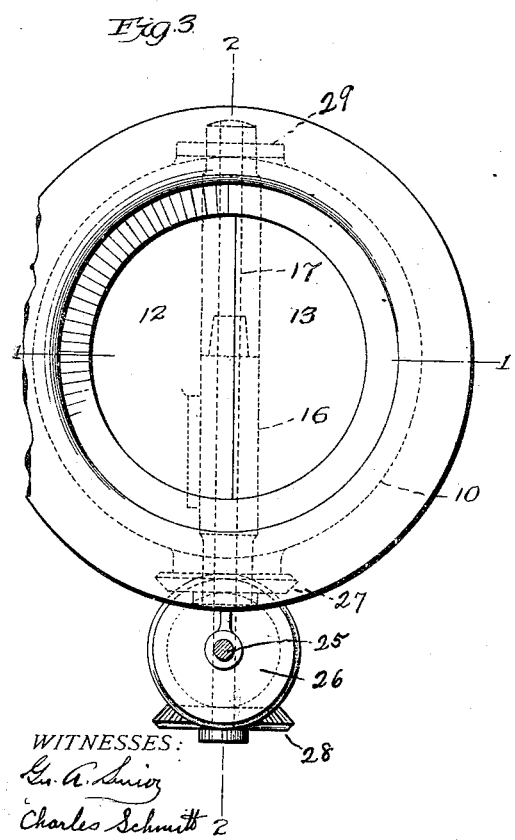
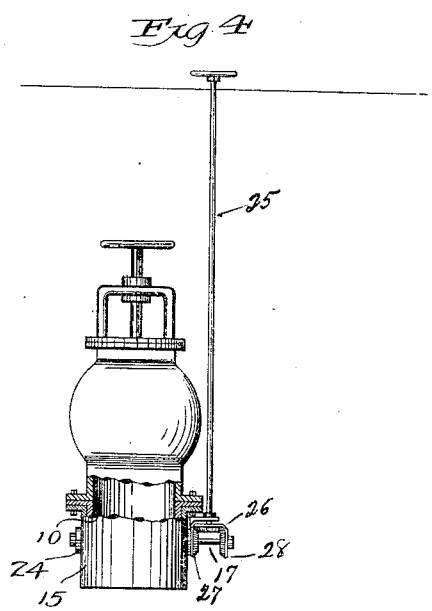

UNITED STATES PATENT OFFICE.

CHARLES FLECK, OF WEST HOBOKEN, AND GERMAN R. MAGEE, OF NORTH BERGEN, NEW JERSEY.

EMERGENCY STOP-VALVE.

1,125,503.  Specification of Letters Patent.  Patented Jan. 19, 1915.

Application filed October 30, 1913. Serial No. 798,214.

*To all whom it may concern:*

Be it known that we, CHARLES FLECK, a citizen of the United States, residing at West Hoboken, in the county of Hudson and State of New Jersey, and GERMAN R. MAGEE, a citizen of the United States, residing at North Bergen, in the county of Hudson and State of New Jersey, have invented a new and useful Emergency Stop-Valve, of which the following is a specification.

Our emergency stop valve relates to a collapsible and expansible valve whereby passage is permitted through the valve case when the valve is collapsed and prevented when the valve is expanded, and the objects of our invention are first, to provide an emergency stop valve whereby the passage of steam, fluid or liquid is permitted or prevented, the valve being used as an independent means for this purpose; second, to provide an emergency stop valve which may be used in conjunction with a valve located in a position interior to our emergency stop valve, whereby in the event of the breaking of such second valve a stop means is had to prevent the passage of steam, fluid or liquid to the broken or inoperative valve, thus permitting repair of such second valve or the substitution of another valve therefor; third, to provide an emergency stop valve which when used in conjunction with an interior valve may be inserted into the nozzle or entrance connecting such second valve with the source of supply of steam, fluid or liquid; fourth, to provide an emergency stop valve which may be operated from a point adjacent to the valve or from a point remote from the valve, as in the case of a ship by means attached to the valve in the hold, or by means located on a higher plane or deck in a position remote from the valve; and fifth, an emergency stop valve which is simple in construction and operation and cheap to manufacture.

To the accomplishment of the above recited objects and others of a similar nature our invention consists in the construction, combination and arrangement of parts set forth in and falling within the scope of the appended claims. And it should be understood that we do not confine ourselves to all the precise details of construction, as there may be modification and variation in certain respects without departing from the spirit of our invention or exceeding the scope of the claims.

We attain these objects by the device illustrated in the accompanying drawings in which—

Figure 1, is a longitudinal section of our emergency stop valve on the line 1—1 of Fig. 3. Fig. 2, is a longitudinal section of our emergency stop valve on the line 2—2 of Fig. 3. Fig. 3, is a cross section of our emergency stop valve. Fig. 4, is a view of our emergency stop valve illustrating a method that can be used to operate the same from a point remote from the location of the valve.

Similar numerals refer to similar parts throughout the several views.

Our emergency stop valve comprises—a case, 10, and a valve, 11, having two leaves or semi-circular portions, 12 and 13. The case, 10, is cylindrical in form and is provided in its interior with a seat, 14, for the valve, 11. The front end or end toward the supply source, of the case, 10, may be flanged to the outside wall or side of the object to which it is attached, as in the case of a vessel to the outside planking, or it may be inserted in the entrance or nozzle, 15, Fig. 2, through which the supply passes to the object with which the valve is used, in the case of a vessel such entrance or inwardly extending nozzle being customarily provided for the introduction of water for use in the vessel.

Each of the leaves, 12 and 13, of the valve, 11, has a hinge portion or enlargement, 16, bored longitudinally to receive a shaft or spindle, 17, which connects the leaves, 12 and 13, and upon which the leaves turn, each leaf being joined to its hinge enlargement, 16, by a flange, 18. Each leaf, 12 and 13, has at its outer end a bevel, 19, which engages with the seat, 14, of the case 10, when the valve, 11, is in position closing passage through the case, 10, the bevels, 19, and the bevel of the valve seat, 14, being ground or otherwise arranged to make tight engagement. The leaf, 12, is provided with a concave surface, 20, and the leaf, 13, is provided with a convex surface, 21, which engages the concave surface 20, when the valve, 11, is expanded or in position closing passage or flow through the case, 10, the parts being ground or otherwise arranged to make a close engagement, the intention being to prevent leakage through these parts of the valve into the case, 10. The hinge enlargement, 16, on the inner end of the leaf, 13, has a nose or projection, 22, which engages a recess, 23, in the hinge enlargement, 16, on the inner end of the leaf, 12, to prevent leakage at this point, the parts being ground or otherwise arranged to make a close fit, the inner ends of the hinge enlargements, 16, also being ground or otherwise arranged closely to connect to prevent leakage into the case 10, on the line of contact of the inner ends of the said hinge enlargements. The hinge enlargement, 16, of the leaf, 12, is extended on its side through the case, 10, and also through the entrance or nozzle, 15, as the case may be, and the hinge enlargement, 16, of the leaf, 13, is extended on its side through the case, 10, and through the entrance or nozzle, 15, as the case may be, the shaft or spindle, 17, also being extended therethrough on the side of the leaf, 13, a stuffing box, 24, or other means being used to prevent leakage at the points of extension into the object or vessel on which our device is used.

The operation of our emergency stop valve is as follows: The parts having been assembled in the case, 10, when the valve is used independently the case is attached at its lower or outer end, or end toward the source of supply, to the outside wall of the object with which it is employed, such as the outside planking of a vessel, and the upper or inner end connected to the desired pipe, the leaves, 12 and 13, being collapsed, as shown in outline Fig. 1, to permit passage through the valve, 11, to the desired pipe. To prevent passage through the valve a turning movement is applied by crank-handle or other suitable means to the extended end of each of the leaves, 12 and 13, to turn the hinge enlargement, 16, of each leaf in an opposite direction on the spindle or shaft, 17, the effect being to turn the leaves upward so that the valve forms a disk which engages the seat, 14, of the case, 10, and thus closes passage therethrough.

If it is desirable to operate our device from a point remote from it such as from an upper plane or deck of a vessel, the arrangement shown in Figs. 3 and 4 may be employed, which comprises a shaft, 25, extending from the deck downward supported by a bracket attached to the outside of the case, 10, and having at its lower end a bevel gear, 26, engaging with a bevel gear, 27, attached to the extended end of the hinge enlargement, 16, of the leaf, 13, of the valve, 11, and with a bevel gear, 28, attached to the extended end of the shaft or spindle, 17, the shaft or spindle, 17, being fastened by a pin, 29, to the extended end of the hinge enlargement, 16, of the leaf, 12, so that the leaf, 12, will turn with the spindle, the bevel gears, 27 and 28, being arranged to turn in opposite directions in response to the turning of the bevel gear, 27, the effect being to turn upward the leaves, 12 and 13, until they form a disk engaging the seat, 14, of the case, 10, and closing passage therethrough. To open the valve 11, for passage the means for operation, whether in close proximity to the valve, 11, or located remote therefrom, the reverse of the above described turning movements is employed whereby the leaves, 12 and 13, are turned downward and the valve, 11, collapsed as shown in outline, Fig. 1, to permit passage through the case, 10. But we do not restrict ourselves to either of the above described means for operation, either immediate to our device or operated from a distance therefrom whereby the leaves, 12 and 13, may be expanded or collapsed to prevent or permit passage through the case, 10, but claim any means for operation by which the leaves, 12 and 13, may be collapsed or expanded to permit or prevent flow through the case, 10, as within the scope of our invention.

When our emergency stop valve is used in conjunction with an entrance or nozzle, 15, the case, 10, is inserted into the entrance or nozzle, 15, so that the flange at the top or inner end of the case, 10, engages with the flange at the top or inner end of the entrance or nozzle, the engaging surfaces of the flanges being ground or otherwise arranged to fit tightly to prevent leakage between the case, 10, and the entrance or nozzle, 15, at this point, the means of attachment being counter-sunk in the flange of the case, 10, so as to provide a smooth surface to which the interior valve, when our device is used with an interior valve, may be bolted or otherwise attached to make a tight fit and prevent leakage between the flange of the valve, 11, and the interior valve.

We claim:

1. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having means on one leaf engaging means on the other leaf whereby when the leaves are expanded leakage is prevented along the line of the hinge, and means for collapsing or expanding the leaves.

2. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having a concave surface on one leaf engaging a convex surface on the other leaf whereby when the leaves are expanded leakage is prevented along the line of the hinge, and means for collapsing or expanding the leaves.

3. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having means for preventing leakage at their inner ends and having means on one leaf engaging means on the other leaf whereby when the leaves are expanded leakage is prevented along the line of the hinge, and means for collapsing or expanding the leaves.

4. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having means for preventing leakage at their inner ends and having means on one leaf engaging means on the other leaf whereby when the leaves are expanded leakage is prevented along the line of the hinge, means for preventing leakage at the outer end of each leaf, and means for collapsing or expanding the leaves.

5. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having means for preventing leakage at their inner ends and having a concave surface on one leaf engaging a convex surface on the other leaf whereby when the leaves are expanded leakage is prevented along the line of the hinge, and means for collapsing or expanding the leaves.

6. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having means for preventing leakage at their inner ends and having a concave surface on one leaf engaging a convex surface on the other leaf whereby when the leaves are expanded leakage is prevented along the line of the hinge, means for preventing leakage at the outer end of each leaf, and means for collapsing or expanding the leaves.

7. An emergency stop valve comprising a case having a valve seat, a valve arranged within the case comprised of leaves each of semi-circular form hinged to allow collapsing or expanding, said leaves when collapsed permitting passage or flow through the case, and forming when expanded a disk engaging the seat of the case to prevent passage or flow therethrough, the leaves having closely connected inner ends and a nose on the inner end of one leaf engaging a recess in the inner end of the other leaf and having a concave surface on one leaf engaging a convex surface on the other leaf whereby when the leaves are expanded leakage is prevented along the line of the hinge, and means for collapsing or expanding the leaves.

8. An emergency stop valve comprising a case having a valve seat, a valve arranged within the case comprised of leaves each of semi-circular form hinged to allow collapsing or expanding, said leaves when collapsed permitting passage or flow through the case and forming when expanded a disk engaging the seat of the case to prevent passage or flow therethrough, the leaves having closely connected inner ends and a nose on the inner end of one leaf engaging a recess in the inner end of the other leaf and having a concave surface on one leaf engaging a convex surface on the other leaf whereby when the leaves are expanded leakage is prevented along the line of the hinge, a stuffing box at the outer end of each leaf, and means for collapsing or expanding the leaves.

CHARLES FLECK.
GERMAN R. MAGEE.

Witnesses:
WM. H. GEE,
W. ADAMO.

Copies of this patent may be obtained for five cents each, by addressing the "Commissioner of Patents, Washington, D. C."